United States Patent [19]

Bouhenguel et al.

[11] Patent Number: 4,968,960
[45] Date of Patent: Nov. 6, 1990

[54] ELECTROMAGNET RELAY WITH FLUX BIASING

[75] Inventors: Redjem Bouhenguel, N. Lauderdale; Shan C. Sun, Coral Springs, both of Fla.

[73] Assignee: ABB Power T & D Company Inc., Blue Bell, Pa.

[21] Appl. No.: 453,741

[22] Filed: Dec. 20, 1989

[51] Int. Cl.$^5$ ............................................. H01H 51/30
[52] U.S. Cl. .................................... 335/101; 335/224; 335/100
[58] Field of Search ................................. 335/100–104, 335/223–225; 324/415, 418, 424; 361/143, 160, 185, 187

[56] References Cited

U.S. PATENT DOCUMENTS

| | | | |
|---|---|---|---|
| 1,893,179 | 1/1933 | Parsons | 335/100 |
| 2,761,999 | 9/1956 | Warrington | 335/22 |
| 2,792,531 | 5/1957 | Glassburn . | |
| 2,909,708 | 10/1959 | Glassburn . | |
| 3,109,962 | 11/1963 | Sonnemann | 335/100 |

FOREIGN PATENT DOCUMENTS 235204 9/1926 United Kingdom .
720020 12/1954 United Kingdom .

Primary Examiner—Leo P. Picard
Assistant Examiner—Lincoln Donovan
Attorney, Agent, or Firm—Richard V. Westerhoff

[57] ABSTRACT

A rotating disc electromagnetic relay has an operating element which applies a torque to the disc tending to close the main contacts and a restraint element generating a torque which together with a spring tends to open the relay contacts. The operating and restraint elements each have an E-shaped core defining two magnetic circuits with a common center leg. Two voltages to be compared are applied to two input coils on the center leg of each element in the same sense to generate a flux representative of the sum of the voltages in the operating element and in the opposite sense to produce a flux representative of the difference between the two voltages in the restraint element. The flux in the common leg of each element divides between the two magnetic circuits. The flux in one magnetic circuit of each element is shifted in phase by a first lag coil on an outer leg of the core to generate the opening and closing torque, respectively. A second lag coil on one leg of one element is selectively shunted to increase the net closing torque by contacts of a shunt relay energized by closure of the main relay contacts. Preferably, the additional lag coil is provided on the outer leg of the second magnetic circuit of the operating element and is shunted by normally closed contacts.

15 Claims, 3 Drawing Sheets

ELECTROMAGNET RELAY WITH FLUX BIASING

BACKGROUND OF INVENTION

1. Field of Invention

This invention relates to electromagnetic relays in which eddy currents induced by electromagnets produce torque to rotate a disc to close a set of electrical contacts. In particular, it relates to such relays having a construction which increases the closing torque upon closure of the contacts to prevent chatter under marginal closing conditions. It has particular application to synchro-verifier relays used in electric power systems to assure that the voltages on two sides of a circuit breaker are approximately the same in magnitude and phase before the breaker is closed.

2. Background Information

A common type of electromagnetic relay includes a rotatable electrically conductive disc carrying a movable contact which makes with a fixed contact when the disc is rotated in a closing direction. Typically, the disc is biased in the open direction by a spring. The disc is rotated in the closing direction against the spring bias by a magnetic element. The magnetic element has an E-shaped core with the ends of the legs of the core forming with a return bar a gap through which the edge of the electrically conductive disc rotates. Magnet flux produced by a current applied to a coil wound on the center leg of the core divides between the two outer legs to form two magnetic circuits which include the gap through which the disc rotates. A shorted lag coil wound on one of the outer legs of the core shifts the phase of the flux in one of the magnet circuits with respect to the other. The out of phase fluxes thus produced in the gap result in application of a closing torque on the disc.

One type of such a relay is a synchro-verifier relay used to determine whether the voltages on the two sides of a circuit breaker are approximately the same in phase and magnitude before the circuit breaker is closed. This relay includes two magnet elements each with an E-shaped magnet core forming a gap through which the disc rotates; an operating element and a restraint element. Each of the magnet elements have two input coils wound on the center leg and a lag coil on one outer leg. The two voltages to be compared are applied to the two input coils of the operating element in the same sense to produce a flux proportional to the sum of the applied voltages, while the same voltages are applied to the two input coils of the restraint element in the opposite sense to produce a flux proportional to the difference between the two voltages.

The fluxes produced in the center legs of the two elements divide between the two outer legs. The lag coil on one outer leg of the core of the operating element shifts the phase of the flux in that leg to produce closing torque on the disc. On the other hand, the lag coil on the one outer leg on the restraint element causes a phase shift which results in the application of an opening torque on the disc. When the two voltages are nearly the same in phase and magnitude, the closing torque will be greater than the opening torque plus a spring bias and the contacts will close. When the voltages are clearly not the same in either/or both phase and magnitude, the opening torque plus the spring bias exceeds the closing torque and the contacts are open. However, when the difference between the two voltages is near the maximum for closure, the closing torque is insufficient to make firm electrical contact and the contacts chatter and do not remain closed. This could occur also in a relay with a single magnetic element when the closing torque is insufficient to hold the contacts closed against the spring bias.

There is a need therefore for an improved electromagnetic relay of this type which makes and maintains solid electrical contact throughout its operating range.

There is a particular need for a synchro-verifier relay which closes without chattering even at the limits of the difference in phase and/or magnitude between two applied voltages. There is a further need for such improvements which can be made easily and economically to existing relays.

SUMMARY OF THE INVENTION

These and other needs are satisfied by the invention which is directed to an electromagnetic relay having magnetic element means which applies an increased closing torque to a rotating disc carrying a movable electrical contact when the movable contact makes with a fixed contact. The increased torque is produced by switching flux phase shifting means to adjust the phase shift between the magnetic flux in the two magnetic circuits in core means of the magnetic element means. Switching is effected by a shunt relay which is energized by closure of the fixed and movable contacts. The flux phase shifting means takes the form of selectively shunted lag coil means.

In the case of the synchro-verifier relay, it is preferable that the lag coil means on the operating element be switched to increase the phase shift between the magnetic fluxes in the two magnetic circuits of the magnetic core. Alternatively, the phase shifting means on the restraint element can be switched to decrease the difference in phase between the fluxes in the two magnetic circuits of the core to reduce the opening torque, thereby producing a greater net closing torque.

In the preferred embodiment of the invention, the phase shifting means includes lag coils on both outer legs of E-shaped cores of at least one magnetic element. While one lag coil on one outer leg of both elements is continuously shorted to provide the phase shift between the fluxes of the cores in the two magnetic circuits required to generate torque on the rotatable disc, as is known in relays of this type, the second lag coil wound on the other outer leg of at least one magnetic element is selectively shorted. In the case of the operating element, the second lag coil is shorted by normally closed contacts of the shunt relay while the fixed and movable contacts are open. This second lag coil shifts the phase of the flux in the second leg, but not as much as the first lag coil in the first leg so that there is a resultant closing torque which is sufficient to close the fixed and movable contacts when the two voltages are within preset limits of each other in magnitude and phase. When the fixed and movable contacts close, the shunt relay is picked up to open the normally closed contacts shorting the second lag coil, so that the phase of the flux in the second leg is no longer shifted and the resultant phase difference in the fluxes in the two legs increases to increase the closing torque.

Where the second lag coil is provided on the restraint element, the second lag coil is shunted after closure of the fixed and movable contacts by normally open contacts of the shunt relay to shift the flux in the second leg in the same direction that the flux in the first outer leg is shifted by the first lag coil, thereby reducing the opening torque.

Alternatively, the second lag coils of either the operating or restraint element can be wound on the same leg as the first lag coil; however, the opposite type of contacts from those discussed above are used in such instances. For instance, if both lag coils are wound on the same leg of the core of the operating element, a normally open shunt contact would be used, and in the case of the restraint element a normally closed contact would be connected in series with the second lag coil.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

The invention will be described as applied a synchro-verifier relay used in an electric power system to assure that the voltages on the two sides of the circuit breaker are approximately the same in phase and magnitude before the circuit breaker is closed. However, it will be evident to those skilled in the art that the invention has application to other types of electromagnetic relays of the rotating disc type.

Figure 1:
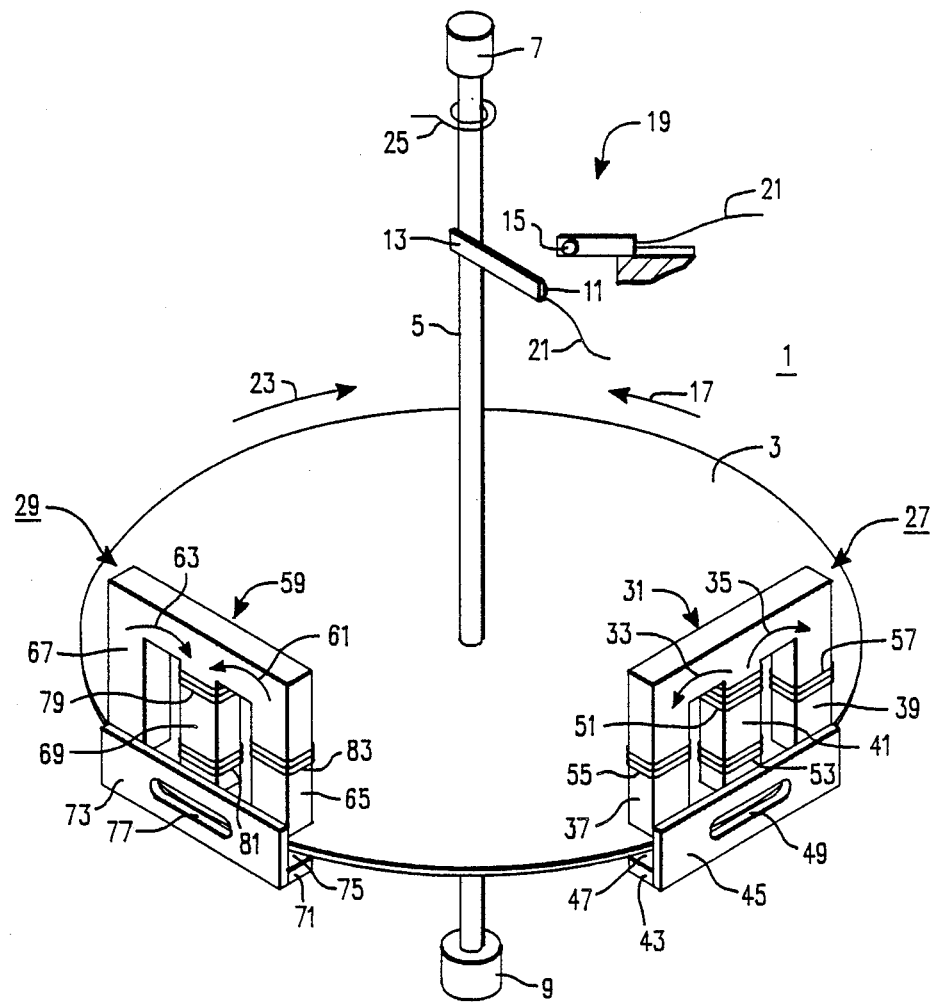
FIG. 1 is an isometric schematic view of a preferred embodiment of an electromagnetic relay incorporating the invention.

Referring to the figures, FIG. 1 illustrates schematically a synchro-verifier relay in accordance with the invention. This relay 1 includes a rotatable, electrically conductive disc 3 mounted on a shaft 5 journaled in upper and lower bearings 7 and 9, respectively. A movable electrical contact is mounted on a support 13 secured to the shaft 5. The movable electrical contact 11 makes contact with a fixed electrical contact 15 when the rotatable disc 3 rotates in a closing direction 17. The movable contact 11 and fixed contact 15 comprise a switch 19 which when the contacts are closed completes an electrical circuit between the leads 21.

When the disc 3 rotates in the opening direction indicated by the arrow 23, the contacts 11 and 15 are opened. The disc 3 is biased in the open direction by a torsion spring 25.

The electromagnetic relay 1 also includes an operating element 27 and a restraint element 29. The operating element 27 comprises an E-shaped laminated magnetic core 31 which defines two magnetic circuits 33 and 35 which include outer legs 37 and 39, respectively, of the core 37 and which share the common center leg 41. The core 1 is mounted (by means not shown) with the legs 37, 39, 41 directed toward the face of the disc 3. A return bar 43 of magnetically permeable material is spaced from the ends of the legs 37, 39 and 41 by a non-magnetic support plate 45 to form a gap 47 in the magnetic circuits 33 and 35 through which the edge of the disc 3 is rotatable. The support plate 45 has a slot 49 through which the disc 3 partially extends.

First and second input coils 51 and 53, respectively, are wound on the center leg 41. A primary lag coil 55 is wound on the leg 37 while a second lag coil 57 is wound on the other outer leg 39.

Similarly, the restraint element 29 includes an E-shaped laminated magnetic core 59 defining first and second magnetic circuits 61 and 63 which include outer legs 65 and 67, respectively, and which share the common center leg 69. Again, the magnetic core 59 is mounted by means not shown with the legs 65, 67 and 69 directed toward the rotating disc 3, and forming with a return bar 71, which is secured to the core 59 by a non-magnetic support plate 73, a gap 75 through which the disc 3 is rotatable. A slot 77 in the support bar 73 provides relief for the rotatable disc 3.

First and second input coils 79 and 81 are wound on the center leg 69 of the magnetic core 59 of the restraint element. A single lag coil 83 is wound on the outer leg 65.

As will described in more detail, voltages from two sides of a circuit breaker are applied to the input coils of the operating and restraint element 27 and 29. These voltages are applied to the input coils 51 and 53 of the operating element 27 in the same sense so that they produce a magnetic flux in the common leg 41 which is the sum of the fluxes produced by the two voltages. This flux divides between the two magnetic circuits 33 and 35 through the outer legs 37 and 39, respectively, the gap 47 and return bar 43. The first lag coil 55 on the leg 37 is shorted. As is well known, this produces a phase shift between the magnetic fluxes in the magnetic circuits 33 and 35. The flux in each of these magnetic circuits induces eddy currents in the electrically conductive disc 3. The magnetic fields which are generated due to these eddy currents interact with the out of phase flux produced by the other magnetic circuit to produce a torque on the disc 3. This torque tends to rotate the disc 3 in the closing direction 17 to the close the contacts 11 and 15. The second lag coil 57 on the other outer leg 39 of the core 31 also produces a lag in the flux in the magnetic circuit 35 when the second lag coil 57 is short circuited. The phase shift generated by the second lag coil 57 is thus in the same direction as the phase shift produced by the lag coil 55, however, it produces a considerably smaller phase shift so that the resultant phase shift is still sufficient to generate enough closing torque on the disc 3 to close the contacts 11 and 15 when the two voltages applied to the input coils 51 and 53 are within preselected limits of being approximately equal in magnitude and phase.

The two voltages to be compared are applied to the two input coils 79 and 81 of the restraint element 59 in the opposite sense so that the magnetic flux produced in the center leg 69 is proportional to the difference in the two voltages. Again, this flux divides between the two magnetic circuits 61 and 63. The lag coil 83 wound on the leg 65 shifts the phase of the magnetic flux in the magnetic circuit 61 so that it lags the flux in the magnetic circuit 63, thereby inducing eddy currents in the electrically conductive disc 3 which produce magnetic fields that interact with the out of phase flux in the gap 75 produced by the other magnetic circuit to apply an opening torque which tends to rotate the disc 3 in the opening direction 23.

When the two voltages are within preset limits of being equal to each other in magnitude and phase, the closing torque produced by the operating element 27 is sufficient to overcome the opening torque produced by the restraint element 23 and the bias applied by the spring 25 to rotate the disc 3 in the closing direction 17 to close the contacts 11 and 15. As will be seen, when the contacts 11 and 15 are closed, the lag coil 57 of the operating element 27 is open circuited so that phase of the flux in the magnetic circuit 35 of the operating element is not shifted in the same direction as the flux in the magnetic circuit 33. Thus, the total difference in phase between the magnetic fluxes in the circuits 31 and 35 is increased to increase the closing torque applied by the operating element 27 to the disc 3 to solidly hold the contacts 11 and 15 in the closed position.

Figure 2:
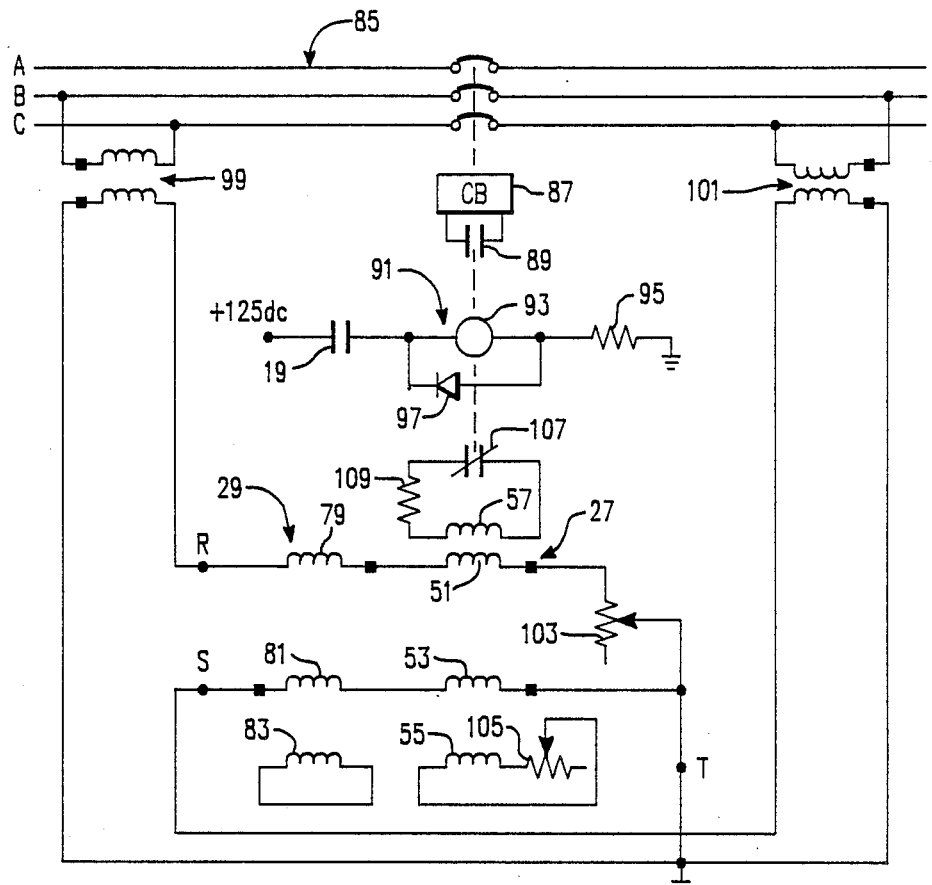
FIG. 2 is a schematic circuit diagram of the electromagnetic relay of FIG. 1 as used as a synchro-verifier relay in an electric power system.

Turning to FIG. 2, there is shown a segment of an electrical power system 85 having three phase conductors A, B, and C. This segment of the electric power system 85 is protected by a circuit breaker 87 which when tripped open circuits the conductors A, B, and C. The circuit breaker 87 can only be reclosed when enabled by closure of contacts 89. The normally open contacts 89 are operated by a shunt relay 91 having a coil 93. The coil 93 of relay 91 is energized by a 125 volt dc power source through the switch 19 formed by the contacts 11 and 15 of the electromagnetic relay 1. A resistor 95 limits the current through the coil 93, and a shunt diode 97 suppresses transients produced by the coil 93 to protect the contacts of the switch 19. The voltages on the two sides of the circuit breaker 87 are monitored by potential transformers 99 and 101 which measure the phase B to C voltages. The square symbols on the transformers, and as will be shown, on the input coils of the operating and restraint elements, indicate polarity. One side of the secondary of the transformer 99 is connected in series with one of the input coils 79 of the restraint element 29, one of the input coils 51 of the operating element 27 and a potentiometer 103. The secondary of the other transformer, 101, is connected through the other input winding 81 of the restraint element 29 and the second input winding 53 of the operating element 27. As discussed previously, the polarity of the windings is such that the flux produced in the common leg of the operating element 27 by the coils 51 and 53 is proportional to the sum of the voltages on the two sides of the circuit breaker 87 while the flux produced in the common leg 69 of the restraint element 29 by the coils 79 and 81 is proportional to the difference between these two voltages. The single lag coil 83 of the restraint element is shorted as indicated. The first lag coil 55 of the operating element 27 is shorted through potentiometer 105. The potentiometers 103 and 105 permit a selection of the difference between the two voltages at which the relay 1 will operate.

The second lag coil 57 of the operating element 27 is connected in series with normally closed contacts 107 of the relay 91 and a resistor 109 which is selected to provide a desired difference in the closing torque between when the contacts 11 and 15 are opened and closed.

As discussed above, if the two voltages measured by the transformers 99 and 101 are approximately equal in phase and magnitude within the limits set by the potentiometers 103 and 105, the closing torque produced by the operating element 27 will exceed the opening torque produced by the restraint element 29 and the spring 25 causing the disc 3 to rotate in a closing direction 17 to close the contacts 11 and 15 of the switch 19. With the switch 19 closed, the coil 93 of the shunt relay 91 is energized. This closes the normally open contacts 89 to enable the circuit breaker 87 to close and also opens the normally closed contacts 107 to open circuit the second lag coil 57 of the operating element 27. With the lag coil 57 not producing a phase shift in the same direction as the lag coil 55, the difference in phase between the fluxes in the two magnetic circuits 33 and 35 of the operating element 27 increases to increase the net torque in the closing direction applied to the contacts 11 and 15.

Figure 3:
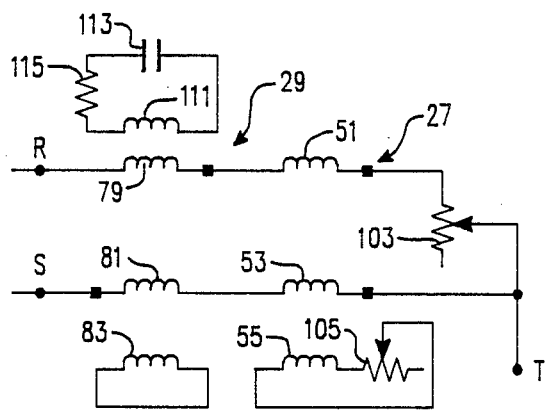
FIG. 3 is a portion of the schematic circuit diagram of FIG. 3 for a first modification of the invention.

FIG. 3 illustrates a modification to the electromagnetic relay 1. Instead of increasing the closing torque generated by the operating element after the contacts 11 and 15 have closed, the embodiment of the relay 1 shown in FIG. 3 decreases the opening torque generated by the restraint element. Thus, the operating element 27 in FIG. 3 only has the one lag coil 55. The restraint element 29 has, in addition to the lag coil 83 wound on the leg 65, a second lag coil 111 wound on the leg 67. The second lag coil 111 is connected in series with normally open contacts 113 of the shunt relay 91 and a resistor 115. With this arrangement, the relay 1 operates s is known until the contacts 11 and 15 close. This results in closure of the normally open contacts 113 to shunt the second lag coil 111 upon pick up of the relay 91. Shunting of the lag coil 111 produces a lag in the flux in the second magnetic circuit 63 in the same direction as the lag produced by the first lag coil 83 in the first magnetic circuit 61, thereby reducing the opening torque generated by the restraint element 29. The net closing torque applied to the disc 3 will thereby increase and solidly hold the contacts 11 and 15 closed. The terminals R, S, and T illustrate where the circuit of FIG. 3 would be substituted into the circuit of FIG. 2.

Figure 4:
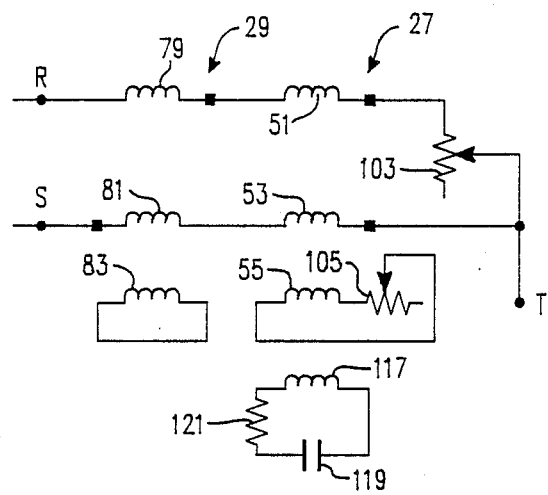
FIG. 4 is a portion of the schematic circuit diagram of FIG. 2 for a second modification of an electromagnetic relay in accordance with the invention.

FIG. 4 illustrates another embodiment of the invention in which a second lag coil 117 is wound on the same outer leg 37 of the operating element 27 as the first lag coil 55 in place of the lag coil 57. This second lag coil 117 is connected in series with normally open contacts 119 of the shunt relay 91 and the resistor 121. With this arrangement, the relay 1 also operates as is known until the contacts 11 and 15 close to energize the relay 91. Pickup of the relay 91 closes the normally open contacts 119 to shunt the second lag coil 117. This causes a further shift in the phase of the magnetic flux in the first magnetic circuit 33 of the operating element 27 with respect to the flux in the second magnetic circuit 35 thereby increasing the closing torque on the disc 3 and solidly holding the contacts 11 and 15 closed.

Figure 5:
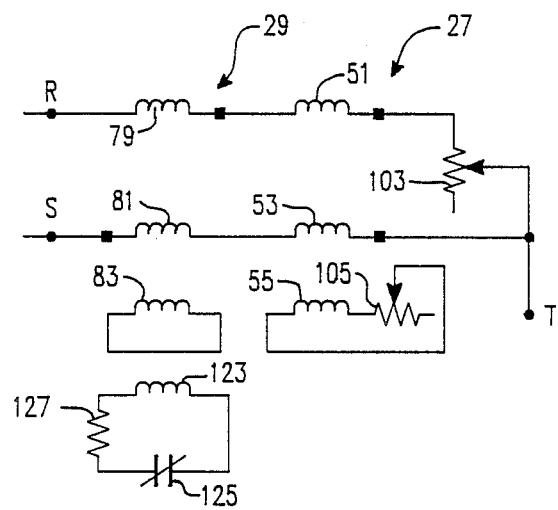
FIG. 5 is a portion of the schematic circuit diagram of FIG. 2 modified for a third embodiment of an electromagnetic relay in accordance with the invention.

FIG. 5 shows yet another modification to the relay 1. The operating element 27 is only provided with the one lag coil 55. The restraint element 29 is provided with a second lag coil 123 wound on the same leg 65 as the first lag coil 83. The lag coil 123 is connected in series with normally closed contacts 125 of the shunt relay 91 and a resistor 127. In this configuration, the second lag coil 123 shifts the phase of the flux in the first magnetic circuit 61 of the restraint element 29 in the same direction as the first lag coil 83 when the contacts 11 and 15 are open. When the two voltages are approximately equal in magnitude and phase and the contacts 11 and 15 close, pickup of the relay 91 opens the normally closed contacts 125. Thus, the difference in phase between the magnetic fluxes in the two magnetic circuits of the restraint element is reduced to reduce the opening torque and thereby increase the net closing torque to hold the contacts 11 and 15 closed.

It should be clear from the above, that various combinations of the additional lag coils could be used to increase the net closing torque on the disc 3 after the contacts 11 and 15 have made. In addition, the invention is applicable to a rotating disc relay which only has an operating element to which a single voltage is applied as an input, and in which the opening torque is provided solely by the spring 25 or some means other than the restraint element 29.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An electrical relay comprising:

a fixed electrical contact and a movable electric contact;

an electrically conductive disc carrying said moveable electrical contact and rotatable in a closing direction to close said fixed and movable electrical contacts and rotatable in an opening direction to open the fixed and movable electrical contacts;

an operating element and a restraint element each having a magnetic core defining two magnetic circuits sharing a common leg and forming a gap through which said electrically conductive disc is rotatable, and a pair of input coils wound on said common leg and to each of which is applied one of two input voltages, said input voltages being applied to said input coils of said operating element to produce a magnetic flux in the common leg of the operating element which is the sum of fluxes produced by the two input voltages, and said input voltages being applied to said input coils of said restraint element to produce a magnetic flux in the common leg of the restraint element which is the difference between fluxes generated by the two input voltages, said fluxes in said common legs dividing between the two magnetic circuits of the operating element and the restraint element; and flux phase shifting means shifting the phase between the magnetic fluxes in the two magnetic circuits of both the operating element and the restraint element to produce a closing torque on said electrically conductive disc by said operating element and an opening torque by said restraint element, said closing torque and said opening torque producing a net closing torque sufficient to close said fixed and moveable electrical contacts when said first and second input voltages are within predetermined limits of being the same in phase and magnitude, said flux phase shifting means being responsive to closure of said fixed and movable electrical contacts to adjust the shift in phase between the magnetic fluxes in the two magnetic circuits in at least one element to increase the resultant closing torque and solidly hold said fixed and movable electrical contacts closed.

2. The relay of claim 1 wherein said flux shifting means includes means adjusting the shift in phase between the magnetic fluxes in the two magnetic circuits of the operating element.

3. The relay of claim 1 wherein said flux shifting means includes adjusting the shift in phase between the magnetic fluxes in the two magnetic circuits of the restraint element.

4. The relay of claim 1 wherein said operating element and restraint element each comprise a magnetic core having said common leg and first and second outer legs defining said two agnetic circuits, and wherein said flux phase shifting means comprises shunted first lag coils wound on the first outer leg of each of said magnetic cores shifting the phase between the magnetic fluxes in the two magnetic circuits, and means adjusting said shift in phase between the flux in said two magnetic circuits comprising a second lag coil wound on one outer leg of one element and actuating means responsive to closure of said fixed and movable electrical contacts to selectively shunt said second lag coil.

5. The relay of claim 4 wherein said one outer leg on which said second lag coil is wound is said second outer leg of said operating element and wherein said actuating means comprises a shunt relay having a shunt relay coil energized by closure of said fixed and movable electrical contacts and normally closed shunt contacts shunting said second lag coil when the fixed and movable electrical contacts are open, and open circuiting said second lag coil when said fixed and movable electrical contacts and closed to increase the shift in phase between the magnetic flux in the two magnetic circuits of the operating element, thereby increasing the net closing torque when said fixed and movable contacts are closed.

6. The relay of claim 4 wherein said one outer leg on which said second lag coil is wound is said first outer leg of the magnetic core of the operating element, and wherein said actuating means comprises a shunt relay having a shunt relay coil energized by closure of the fixed and movable electrical contacts and normally open shunt contacts operated by energization of said shunt relay coil to shunt said second lag coil when said fixed and movable electrical contacts are closed to increase the shift in phase between the magnetic fluxes in the first and second magnetic circuits of the operating element, thereby increasing the net closing torque when said fixed and movable electrical contacts are closed.

7. The relay of claim 4 wherein said one outer leg on which said second lag coil is wound is the second outer leg of the magnetic core of said restraint element, and wherein said actuating means comprises a shunt relay having a shunt relay coil which is energized by closure of said fixed and movable electrical contacts and normally open shunt contacts which are closed by energization of the shunt relay coil to shunt the second lag coil when said fixed and movable contacts are closed and reduce the phase shift between the magnetic fluxes in the first and second magnetic circuits of the restraint element, thereby reducing the opening torque applied to the disc when the fixed and movable electrical contacts are closed.

8. The relay of claim 4 wherein said one outer leg on which said second lag coil is wound is said first outer leg of the restraint element and wherein said actuating means comprises a shunt relay having a shunt relay coil which is energized by closure of the fixed and movable electrical contacts and normally closed shunt contacts shunting the second lag coil when said fixed and movable contacts are open and actuated by energization of said shunt relay coil to open circuit the second lag coil when said fixed and movable contacts are closed to reduce the phase shift between the first and second magnetic circuits in said restraint element, thereby reducing the opening torque applied to the disc when said fixed and movable electrical contacts are closed.

9. The relay of claim 4 wherein said actuating means comprises a shunt relay having a shunt relay coil energized by closure of the fixed and movable contacts, and shunt contacts in series with said second lag coil, and including a transient suppressing diode connected across said shunt relay coil.

10. The relay of claim 9 including a resistor in series with said second lag coil and said shunt contacts selected to set the amount by which the shift in phase between the magnetic fluxes in the first and second magnetic circuits of said one element is adjusted when said shunt contacts are closed.

11. An electrical relay comprising:
a fixed electrical contact and a movable electrical contact:
an electrically conductive disc carrying said movable electrical contact and rotatable in a closing direction to close said fixed and movable electrical contacts, and rotatable in an opening direction to open the fixed and movable electrical contracts;
an operating element having a magnetic core defining two magnetic circuits sharing a common leg and forming a gap through which said electrically conductive disc is rotatable, and input coil means wound on said common leg and to which an input voltage signal is applied to produce magnetic flux in said two magnetic circuits;
restraint means applying an opening torque to said rotatable disc tending to rotate said disc in the opening direction; and
flux phase shifting means shifting the phase between the magnetic fluxes in said two magnetic circuits of the operating element to produce a closing torque tending to rotate the electrically conductive disc in the closing direction to close said fixed and movable electrical contacts in response to predetermined values of the input voltage signal, said flux phase shifting means including means responsive to closing of said fixed and movable electrical contacts to increase the shift in phase between the magnetic fluxes in the two operating element magnetic circuits to increase the closing torque applied by the operating element to the electrically conducting disc to solidly close said fixed and movable electrical contacts.

12. The relay of claim 11 wherein said operating element comprises a magnetic core having said common leg and first and second outer legs defining said two magnetic circuits, and wherein said flux phase shifting means comprises a shunted first lag coil wound on the first outer leg of said magnetic core shifting the phase between the magnetic fluxes in the magnetic circuits, and means adjusting said shift in phase between the fluxes in said two magnetic circuits comprising a second leg coil wound on one outer leg of the magnetic core and actuating means responsive to closure of said fixed and movable electrical contacts to selectively shunt said second lag coil.

13. The relay of claim 12 wherein said actuating means comprising a shunt relay having a shunt relay coil which is energized by closure of said fixed and movable electrical contacts, and shunt contacts operated by said shunt relay coil to selectively shunt said second lag coil.

14. The relay of claim 13 wherein said one outer leg on which said second lag coil is wound is said second outer leg of the magnetic core and wherein said shunt contacts are normally closed contacts.

15. The relay of claim 13 wherein said one outer leg on which said second lag coil is wound is said first outer leg of the magnetic core and wherein said shunt contacts are normally open contacts.

* * * * *

UNITED STATES PATENT AND TRADEMARK OFFICE
CERTIFICATE OF CORRECTION

PATENT NO. : 4,968,960
DATED : November 6, 1990
INVENTOR(S) : REDJEM BOUHENGUEL ET AL.

It is certified that error appears in the above-identified patent and that said Letters Patent is hereby corrected as shown below:

On the title page, item [54] and col. 1, in the title, "ELECTROMAGNET" should be --ELECTROMAGNETIC--.

In the Abstract, after the last line, the following should be inserted: --Alternatively, the additional lag coil may be provided on the same outer leg of the operating element as the first lag coil and shunted by normally open contacts. In other embodiments, the additional lag coil is provided on the restraint element: on the same outer leg of the core as the first lag coil and shunted by normally closed contacts, or on the other outer leg of the restraint element core and shunted by normally open contacts.--

Column 6, line 25, "s" should be --as--.

Claim 3, column 8, line 4, --means-- should be inserted after "includes".

Claim 4, column 8, line 10, "agnetic" should be --magnetic--.

Claim 5, column 8, line 29, "and" should be --are--.

Signed and Sealed this

Eighth Day of December, 1992

Attest:

DOUGLAS B. COMER

Attesting Officer

Acting Commissioner of Patents and Trademarks